United States Patent [19]

Olbrich

[11] Patent Number: 4,803,411
[45] Date of Patent: Feb. 7, 1989

[54] INDUSTRIAL SEWING MACHINE

[75] Inventor: Bernd Olbrich, Ketsch, Fed. Rep. of Germany

[73] Assignee: Frankl & Kirchner GmbH & Co. KG, Schwetzingen/Baden, Fed. Rep. of Germany

[21] Appl. No.: 101,588

[22] Filed: Sep. 28, 1987

[51] Int. Cl.$^4$ .............................................. G08C 19/16
[52] U.S. Cl. .................................. 318/564; 340/825.6; 112/1
[58] Field of Search ................ 318/564, 565; 112/275, 112/445, 1; 340/825.06, 825.23, 825.57, 825.59, 825.6; 307/475, 572, 573; 371/11, 24, 63, 70, 72; 375/55, 84, 87

[56] References Cited

U.S. PATENT DOCUMENTS

| | | | |
|---|---|---|---|
| 3,646,364 | 2/1972 | Kaminski | 307/572 |
| 3,962,647 | 6/1976 | Richman | 375/55 X |
| 4,412,163 | 10/1983 | Angersbach et al. | 318/567 |
| 4,638,311 | 1/1987 | Gerety | 340/825.06 |
| 4,639,727 | 1/1987 | Blasius et al. | 340/825.57 |

FOREIGN PATENT DOCUMENTS 59-223829 12/1984 Japan ............................ 340/825.07
60-103851 6/1985 Japan ............................ 340/825.06

Primary Examiner—Bentsu Ro
Attorney, Agent, or Firm—Felfe & Lynch

[57] ABSTRACT

An industrial sewing machine having a main shaft which can be driven by an electric motor drive, a positioner disposed on the main shaft, a regulating and control system controlling the electric motor drive, an operating and display system, and an interface system producing the connection between the operating and display system on the one hand and the regulating and control system on the other. Such an industrial sewing machine is to be configured such that great freedom from electrical interference will be achieved in spite of the individual connection of additional unfiltered electrical components. For this purpose two lines are provided for each component for carrying signals back and forth among any number of connected components, and the output of each of the connected components has a driver stage with a system for inverting the signal that is to be transmitted, an inverted signal being transmitted over the one line and a non-inverted signal over the other, and the input of each of the connected components includes a difference detector to determine the difference between the two arriving signals.

2 Claims, 3 Drawing Sheets

INDUSTRIAL SEWING MACHINE

The invention relates to an industrial sewing machine having a main shaft which can be driven by an electric motor drive, a positioner disposed on the main shaft, a regulating and control system controlling the electric motor drive, an operating and display system, and an interface system producing the connection between the operating and display system on the one hand and the regulating and control system on the other.

An industrial sewing machine and an electronic positioning drive of the above-described kind are disclosed in German Patent publicaton DE-OS No. 29 38 040.

In this known embodiment the external operating elements are connected by parallel terminal connections which are scanned by the drive control. Such a connection between the operating and display system and the regulating and control system cannot guarantee under all conditions that the communication between the two components and any other conceivable external components will take place with the required reliability, since the electronic components in the vicinity of sewing machines can be disturbed, for example, by the operation of relays or magnets and the electromagnetic fields produced thereby.

Setting out from this state, the invention is addressed to the problem of connecting the individual components of an industrial sewing machine together such that great freedom from interference will be achieved with regard to the connections available, together with great flexibility and simplicity of wiring.

This problem is solved according to the invention by the fact that the interface for the transfer back and forth of signals includes two conductors each, that the output of each system has a driver stage with a device for inverting the signal to be transmitted, an inverted signal being transmitted through one conductor and a non-inverted signal through another, and that the input of each system includes a difference detector to establish the difference between the two arriving signals.

Such an interface, which can correspond, for example, to the known RS 422 specification, brings it about that a very great freedom from interference is achieved without additional filters such as RC networks, for example. The amount of wiring is reduced by the serial data transfer provided by the configuration according to the invention, and a plurality of individual units, such as the control unit, the controls, test equipment, memories, etc., can be connected to a single data bus, so that the entire system is adaptable to expansion and individually desired configurations. Also, an efficient data throughput is achieved, since components which are not addressed automatically separate themselves from the data bus and being thus separated from the rest of the system can perform their own functions in parallel time. Lastly, it is also possible to further improve freedom from interference by distributing operating instructions to several system components or storing them in multiple.

In the configuration according to the invention, a signal that is to be transmitted is divided symmetrically into a normal signal and an inverted signal, the two signals being transmitted via separate wires. At the receiving end the two signals are combined such that the difference between the two signals has to exceed a given threshold in order to produce an output signal.

In the data transmission technique it uses, the industrial sewing machine according to the invention thus is a basic departure from the prior-art attempts to improve the freedom of such machines and their corresponding control and drive systems from interference, since the attempt has always been made in the past to make the individual components themselves as free as possible from interference and accordingly to test a finished sewing machine or a drive therefor by classical methods of interference testing or to render it free from interference by employing individual countermeasures.

This conventional approach, however, does not allow for the circumstance that the electronic components of industrial sewing machines are always more complex and hence more difficult to test for any conceivable interference, and that on the other hand industrial sewing machines are often converted or equipped with attachments by their purchasers according to their individual requirements, in a manner that the manufacturers cannot foresee and provide for.

Furthermore, provision is preferably made such that with the input and output of each of the n components there is associated a sending or receiving unit for the transmission or reception of signals coded individually for a specific component. By this configuration it is possible to connect all components to a common bus, so that no parallel signal transmission to each individual component is necessary and the system can be adapted and expanded in almost any desired manner without any great amount of hardware modification.

In accordance with the invention, an industrial sewing machine comprises a main shaft which can be driven by an electric motor drive. The sewing machine includes a positioner disposed on the main shaft. The machine also includes a regulating and control system controlling the electric motor drive in accordance with the positioner. The machine also includes an operating and display system, and an interfacing system for providing a connection between the regulating and control system, the operating and display system and additional components. The interfacing system includes, for the transmission back and forth of signals between n connected components, two lines (34, 35 and 36, 37, respectively) for each of the n connected components. Each of the n components includes an output having a driver stage (28) with a system for inverting the signal to be transmitted and including an output for transmitting a non-inverted signal; an inverted and a non-inverted signal (LB and LA, respectively) being transmitted via one line each, and each of the n components including an input which includes a difference detector (27) for forming the difference between two arriving signals (LA and LB, respectively).

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

DETAILED DESCRIPTION OF PREFERRED EMBODIMENT

Figure 1:
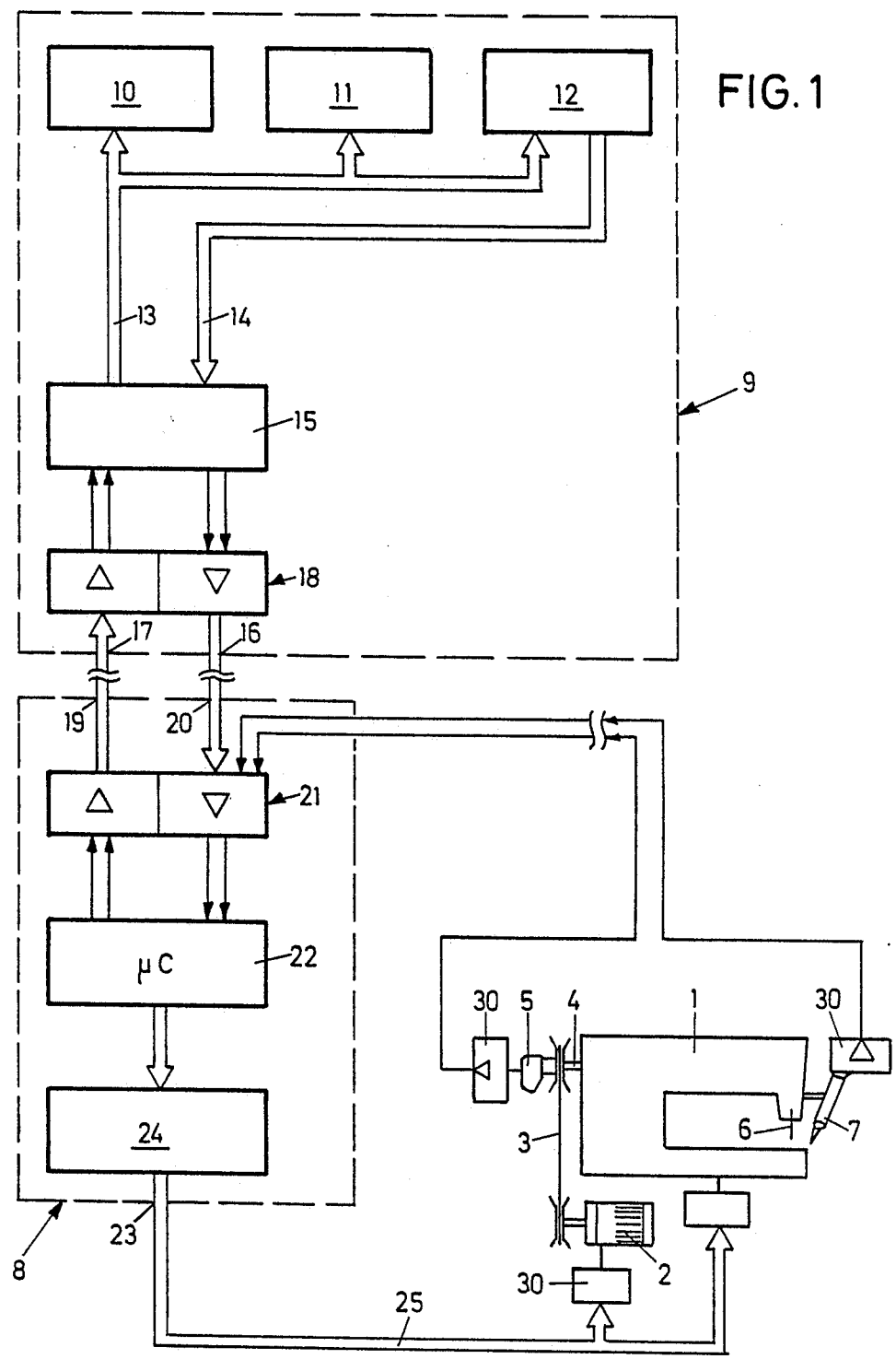
FIG. 1 is a block diagram of an industrial sewing machine according to the invention, with an external regulating and control system and an external operating and display system.

In FIG. 1 an industrial sewing machine 1 is diagrammatically represented, which is driven through the belt drive 3 from a positioning drive 2. A positioner 5 is disposed on the diagrammatically represented main shaft 4 of the sewing machine 1. In the sewing area in front of the needle 6 there is provided a sensor in the form of a photoelectric cell 7.

A regulating and control system 8 is associated with the positioning drive 2 and sewing machine 1. The operation and control is exercised through an operating and display system 9.

The operating and display system 9 includes a display 10, a light emitting diode panel 11 and an input keyboard 12. These are connected via data lines 13 and 14 to a microprocessor 15, and a transmitting and receiving system 18 is disposed between microprocessor 15 and the input and output 16 and 17, respectively.

A transmitting and receiving system 21 and a microprocessor 22 are likewise connected to the output 19 and input 20, respectively, of the regulating and control system 8. Between the microprocessor 22 and the output 23 are power output stages 24 by which the sewing machine 1 and the positioning drive 2 are actuated through the line 25.

Figure 2:
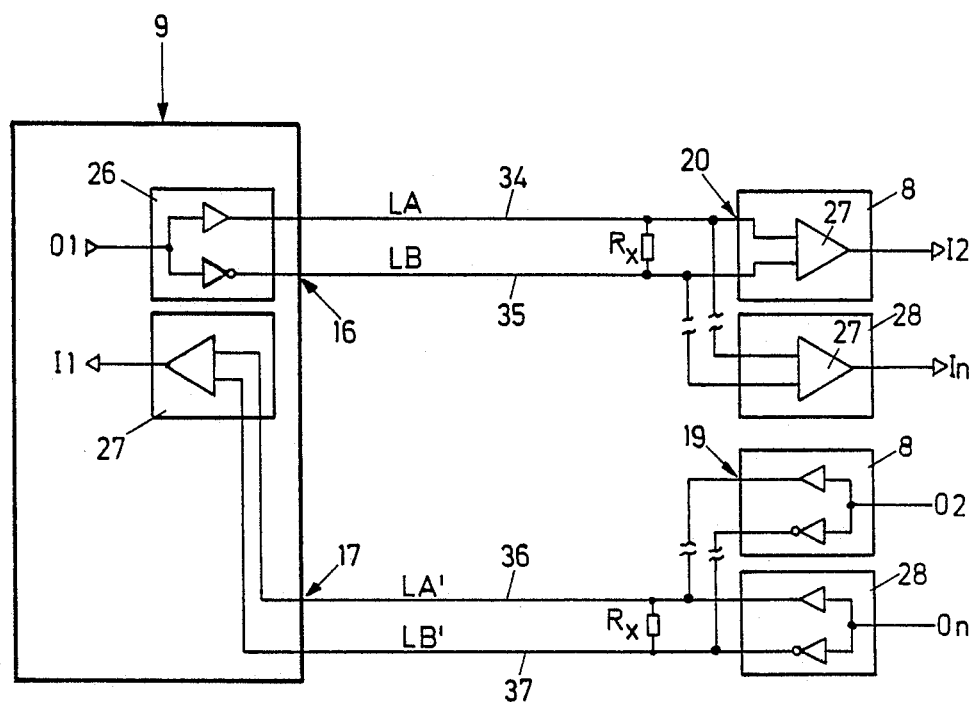
FIG. 2 is a diagram of the signal transmission paths between an operating and display system and components to be controlled thereby.

FIG. 2 shows diagrammatically, omitting components not important to the following description, the section ahead of the output 16 and the input 17 of the operating and display system 9. The output 16 is preceded by a driver stage with a system for inverting the signal 01 that is to be transmitted. The input 17 is followed by a difference detector 27 (containing, e.g., an SN 75175) to determine the difference between the arriving signals LA' and LB' and produce the input signal I1.

The input signal 20 of the regulating and control system 8 is connected to the output 16, and the input 17 of the operating and display system is connected to the output 19 of the regulating and control system 8. Additional components, such as an additional, independently operating sewing machine 28 (cf. FIG. 4) can be wired, as component n, for example, parallel to the input 20 and the output 19 of the regulating and control system.

Between the lines 34-35 and 36-37 carrying the signals LA and LB and the signals LA'and LB', respectively, there is disposed a resistance $R_x$ in each case. This resistance $R_x$ (1000 ohms, for example) serves for setting a threshold $S_{LA}$ and $S_{LB}$, respectively, which determines the formation of the output signal I.

Figure 3:
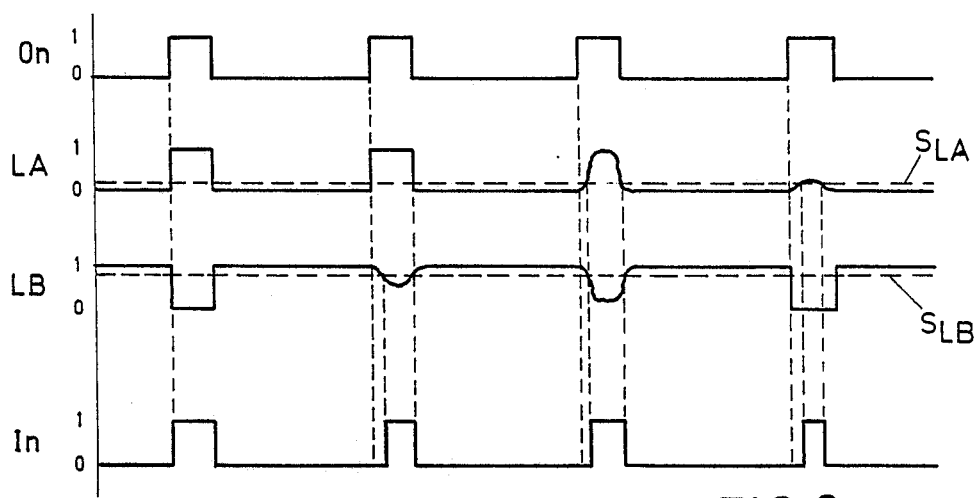
FIG. 3 is a graph of the signals generated and transmitted.

The formation and transfer of the signals is represented in FIG. 3.

An output signal On from component n, e.g., the output signal 01 of the operating and display system 9, is split into an inverted signal LB and a non-inverted signal LA and transmitted by the driver stage 26 (containing an SN 75174, for example). After the transmission is complete, the signal form LA and LB represented in FIG. 3 is the result. From these transmitted signals LA and LB a difference detector 27 forms an output signal $I_n$ for component n, e.g., the output signal I2 for the regulating and control system 8. Interference components are cut off in accordance with the level of the threshold value $S_{LA}$ AND $S_{LB}$ established by the resistance $R_x$. By this technique of transmission a sure separation of signal and interference and thus a very reliable signal transmission is possible.

Figure 4:
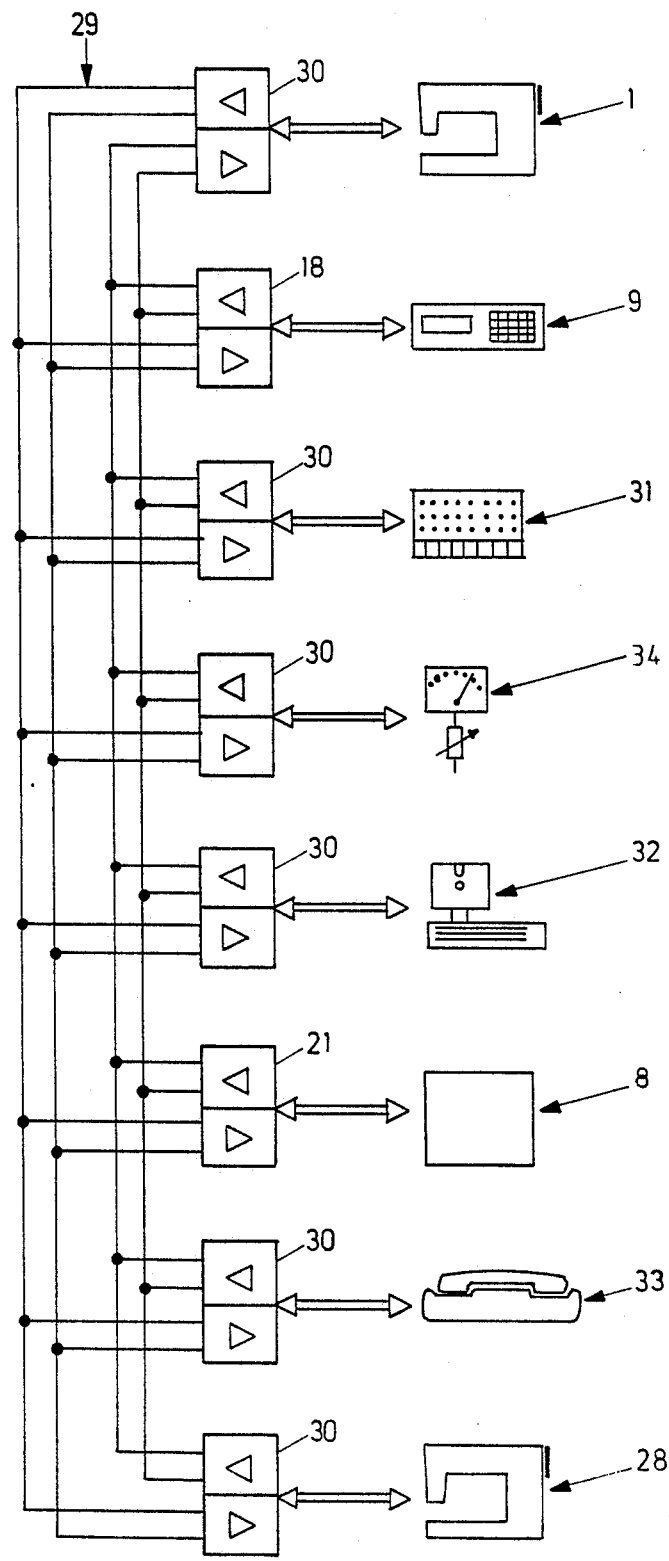
FIG. 4 is a diagrammatic representation of the system of various dependent components on a common data bus.

In FIG. 4 is shown how the individual components can be connected together by a common data bus 29. With each component is associated a send-receive system 30 which corresponds to the described send-receive systems 18 and 21. Such components can be, in addition to the above-mentioned sewing machine 1, the operating and display system 9, the photoelectric cell 7, the control and regulating system 8, and an additional, independently operating sewing machine 28, test instruments 31, disk drives 32, modems 33, the positioner 5, etc., as well as sensors 34 for detecting pressure, temperature and field.

In each case a coded signal is put out via the data bus, so that only that receiving system of the addressed component is activated which is coded accordingly. The coding and decoding can be performed by means of the microprocessors 15 and 22 or other corresponding microprocessors, or by means of logic circuits known in themselves.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An industrial sewing machine comprising:
    a main shaft which can be driven by an electric motor drive;
    a positioner disposed on the main shaft;
    a regulating and control system controlling the electric motor drive in accordance with the positioner;
    an operating and display system; and
    an interfacing system for providing a connection between the regulating and control system, the operating and display system and additional components;
    the interfacing system including, for the transmission back and forth of signals between n connected components, two lines for each of the n connected components, each of the n components including an output having a driver stage with a system for inverting the signal to be transmitted and an output for transmitting a non-inverted signal; said inverted signal and said non-inverted signal being transmitted via one line each, and each of the n components further including a difference detector, having two inputs connected to each said line, for forming the difference between the inverted and non-inverted signals.

2. An industrial sewing machine according to claim 1, including one sending and one receiving system associated with the output of each of the n components for sending and receiving signals individually coded for a specific component.

* * * * *